(12) United States Patent
Kashiwagi et al.

(10) Patent No.: US 6,663,935 B1
(45) Date of Patent: Dec. 16, 2003

(54) DISK-LIKE MULTILAYER INFORMATION RECORDING MEDIUM AND PRODUCTION METHOD THEREOF

(75) Inventors: Toshiyuki Kashiwagi, Tokyo (JP); Takeshi Yamasaki, Kanagawa (JP); Motohiro Furuki, Tokyo (JP); Tomomi Yukumoto, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/743,829

(22) PCT Filed: Jan. 18, 2000

(86) PCT No.: PCT/JP00/00202
§ 371 (c)(1),
(2), (4) Date: May 14, 2001

(87) PCT Pub. No.: WO00/70608
PCT Pub. Date: Nov. 23, 2000

(30) Foreign Application Priority Data

May 17, 1999 (JP) .......................................... P11-136432

(51) Int. Cl.[7] .................................................. G11B 5/66
(52) U.S. Cl. .................... 428/64.2; 428/64.4; 428/65.1; 428/65.2; 428/694 ST; 428/900; 369/13; 369/275.1; 369/275.4; 156/230; 156/233; 156/234; 156/241; 156/247; 156/289; 156/379.8; 156/391
(58) Field of Search .......................... 428/64.2, 694 ST, 428/64.4, 65.1, 65.2, 900; 369/275.1, 275.4, 13; 156/230, 233, 234, 289, 241, 247, 379.8, 391

(56) References Cited

U.S. PATENT DOCUMENTS

| | | | | |
|---|---|---|---|---|
| 4,931,313 A | * | 6/1990 | Arakawa et al. | 427/164 |
| 5,708,652 A | * | 1/1998 | Ohki et al. | 369/275.1 |
| 6,180,200 B1 | * | 1/2001 | Ha et al. | 428/64.1 |
| 6,221,454 B1 | * | 4/2001 | Saito et al. | 428/64.1 |
| 6,455,121 B1 | * | 9/2002 | Ha et al. | 428/64.1 |
| 6,524,418 B2 | * | 2/2003 | Yamasaki et al. | 156/230 |

FOREIGN PATENT DOCUMENTS

| | | | |
|---|---|---|---|
| JP | 63-53602 | * | 10/1988 |
| JP | 8-235644 | * | 9/1996 |
| JP | 8-263874 | * | 10/1996 |
| JP | 9-81962 | * | 3/1997 |
| WO | WO 00/18531 | | 4/2000 |

* cited by examiner

*Primary Examiner*—Leszek Kiliman
(74) *Attorney, Agent, or Firm*—Sonnenschein, Nath, Rosenthal LLP

(57) ABSTRACT

The present invention relates to a multi-layered disc-shaped information recording medium having a plurality of signal recording layers each carrying information signals. In preparing the recording medium, a first substrate obtained on punching a sheet obtained in turn by having a signal recording pattern transcribed on it from a first stamper and by forming a semi-transparent film on a signal surface is bonded to a second substrate obtained on injection molding a synthetic resin material. The second substrate is prepared by having transcribed to it a signal recording pattern formed on a second stamper provided on an injection molding device. A reflective film is formed on a signal surface having the transcribed second substrate. The first and second substrates are bonded together on their signal recording layers by a transparent adherent layer.

17 Claims, 14 Drawing Sheets

DISK-LIKE MULTILAYER INFORMATION RECORDING MEDIUM AND PRODUCTION METHOD THEREOF

This application claims priority of Japanese Patent Application No. P11-136432 filed on May 17, 1999, and PCT Application PCT/JP00/00202 filed on Jan. 18, 2000, which are hereby incorporated by reference, to the extent permitted by law.

TECHNICAL FIELD

This invention relates to a disc-shaped multi-layered recording medium, having plural layers, carrying information signals thereon, and a method for producing the same.

BACKGROUND OF THE INVENTION

In a field of information recording, an optical information recording system is used. The optical information recording system has a number of advantages, such that, in the optical information recording system, information signals can be recorded and/or reproduced without a recording and/or reproducing head contacting a recording medium, and a recording density higher by not less than one digit than in the magnetic recording system can be achieved, while respective memory configurations, such as replay-only, write once or overwrite type memory configuration, can be coped with. So, a wide range of application ranging from the industrial usage to domestic usage has been proposed for the optical information recording system as a system enabling realization of an inexpensive large-capacity file.

Especially among them are commonly used a high-density information recording medium, an optical video disc, etc. called a digital video disc or a digital versatile disc which are optical discs coping with replay-only memory configuration.

In this sort of the optical disc, a reflective film, as a thin metal film of e.g., aluminum, is formed on an optical disc substrate, as a transparent substrate, carrying a crest-and-recess pattern, such as pits and grooves, representing information signals. On this reflective film is formed a protective film for protecting this reflective film from moisture and oxygen in atmosphere. For reproducing the information from the optical disc, the reproducing light, such as laser light, is illuminated from the side optical disc substrate on the crest-and-recess pattern to detect the information based on the difference in light reflectance between the incident light and the reflected light.

For manufacturing this optical disc, an optical disc substrate, carrying the crest and recess pattern, is formed by a technique, such as injection molding, and a reflective film, comprised of a thin metal film, is formed by any suitable technique, such as vapor deposition. On this reflective film is applied a ultra-violet light curable resin to form a protective film.

In this optical disc, it is desired to realize a high recording capacity. In order to meet this demand, such an optical disc is proposed in which a crest-and-recess pattern is formed on one surface of an optical disc substrate, a semi-transparent film is formed thereon, a crest-and-recess pattern is again formed on this semi-transparent film, at an interval of tens of micrometers ($\mu$m), and a reflective film is formed thereon, with the optical disc having a sum total of two information substrate layers.

It is desirable that the multi-layered disc-shaped recording medium, having these signal layers, be of large capacity and high productivity and be readily producible.

SUMMARY OF THE INVENTION

It is therefore an object of the present invention to provide a multi-layered information recording medium realizing a large recording capacity and which can be produced readily in larger quantities.

For accomplishing the above object, the present invention provides a multi-layered disc-shaped information recording medium having a plurality of signal recording layers each carrying information signals. In preparing the recording medium, a first substrate obtained on punching a sheet obtained in turn by having a signal recording pattern transcribed on it and by forming a semi-transparent film on a signal surface is bonded to a second substrate obtained on injection molding a synthetic resin material. The second substrate is prepared by having transcribed to it a signal recording pattern formed on a second stamper provided on an injection molding device. A reflective film is formed on a signal surface having the transcribed second substrate. The first and second substrates are bonded together on their signal recording layers by a transparent adherent layer.

The present invention also provides a method for producing a multi-layered disc-shaped information recording medium having plural layers each carrying a signal recording pattern, including a first substrate forming step of preparing a first substrate by transcribing a signal recording pattern formed on a first stamper onto a sheet to produce a signal surface, forming a semitransparent film on the signal surface and by punching the resulting sheet, a second substrate forming step of preparing a second substrate by transcribing a signal recording pattern formed by injection molding on a second stamper, and by forming a reflective film on a resulting signal surface, and a bonding step of bonding the first and second substrates by a transparent adherent layer.

In the first substrate forming step, the signal recording pattern is transcribed to the sheet from the first stamper and a semi-transparent film is formed on a resulting signal surface having the signal recording pattern transcribed thereon. The resulting sheet is punched to produce a first substrate. In the second substrate forming step, the signal recording pattern formed on the second stamper by injection molding is transcribed to form a signal surface and a reflective film is formed thereon to produce a second substrate.

In the first substrate forming step, a continuous sheet is used to prepare a first substrate. In the bonding step, the first and second substrates are bonded together by a transparent adherent layer to render it possible to produce multi-layered disc-shaped information recording mediums in large quantities. In the second substrate forming step, the second substrates can be produced in large quantities by injection molding. By using these steps, the multi-layered large-capacity disc-shaped information recording mediums can be readily produced in large quantities.

In the first substrate forming step, the first stamper is fed with resin and the first stamper is pressured and/or UV light rays are illuminated on the sheet of synthetic resin for transcribing the signal recording pattern from the first stamper to the sheet of synthetic resin. Moreover, in the first substrate forming step, the first stamper is pressured against the sheet of synthetic resin for directly transcribing the signal recording pattern to the sheet from the first stamper.

In the bonding step, a photo-curable resin is used as a transparent adherent layer, and the first and second substrates are rotated to control the thickness of the transparent adherent layer to unify the first and second substrates through the transparent adherent layer.

If, in the bonding step, UV light rays are illuminated on the transparent adherent layer as a point light source for the UV light rays which is moved from the inner rims towards the outer rims of the first and second substrates, the transparent adherent layer may be photo-cured by simply moving the light source for the UV light rays.

On the first stamper used in the present method, the signal recording pattern is produced as an inverted pattern from a pattern obtained on sputtering a mother stamper with metal.

The first and second substrates are bonded together using a pressure-sensitive adhesive.

The transparent adherent layer used and the resin for signal transcription are both dry photo-polymers.

The sheet making up the first substrate used in the present invention is formed by bonding a protective sheet to a pressure-sensitive sheet after transcribing the signal recording pattern from the first stamper to the pressure-sensitive sheet, removing the protective sheet for use as a first substrate, on which the second substrate is bonded.

The surface of the sheet used in the present invention, on which falls the laser light for recording and/or reproduction, is coated with a protective agent. This protective agent increases surface hardness or lowers the surface resistance or frictional coefficients.

The present invention also provides a method for producing a multi-layered disc-shaped information recording medium having plural layers each carrying a signal recording pattern. The method includes a first substrate forming step of preparing a first substrate by forming a signal recording pattern provided on a first stamper on a sheet and by forming a semi-transparent film on a signal surface carrying the signal recording pattern, and a semi-transparent film forming step of forming one or more semi-transparent films, having a signal recording pattern transcribed thereon, on the semi-transparent film of the first substrate by the interposition of a transparent adherent layer at a separation preferably of tens of $\mu$m.

In producing a multi-layered disc-shaped information recording medium, having plural signal layers, a signal recording pattern is transcribed from the first stamper to a sheet in the first substrate forming step, and one or more semi-transparent films, now carrying the signal recording pattern, are formed on the semi-transparent film of the first substrate with the interposition of a transparent adherent layer at a separation of tens of $\mu$m.

Other objects, features and advantages of the present invention will become more apparent from the following detailed description of the present invention and the claims.

DESCRIPTION OF THE INVENTION

Figure 1:
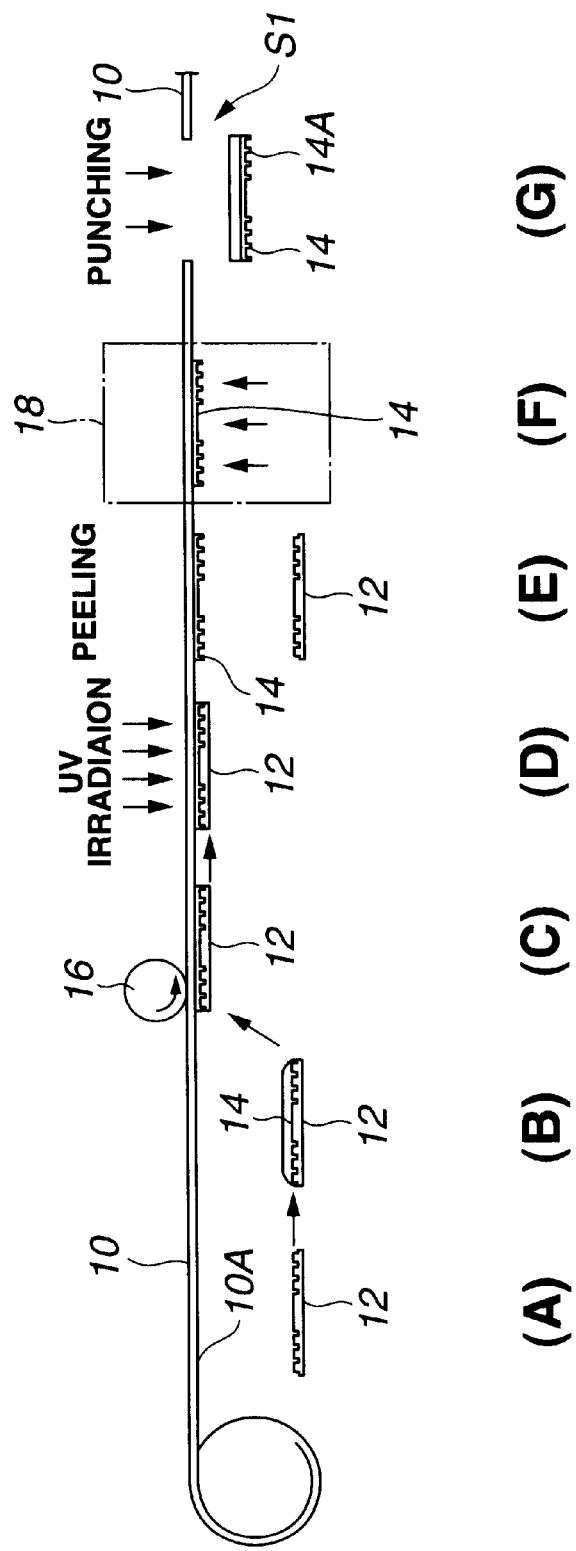
FIG. 1 is a schematic view showing a first substrate preparing step in a manufacturing method of a multi-layered disc-shaped information recording medium according to the present invention.

Referring to the drawings, a method for producing a multi-layered information recording medium and a multi-layered information recording medium manufactured by this method are explained in detail.

Figure 2:
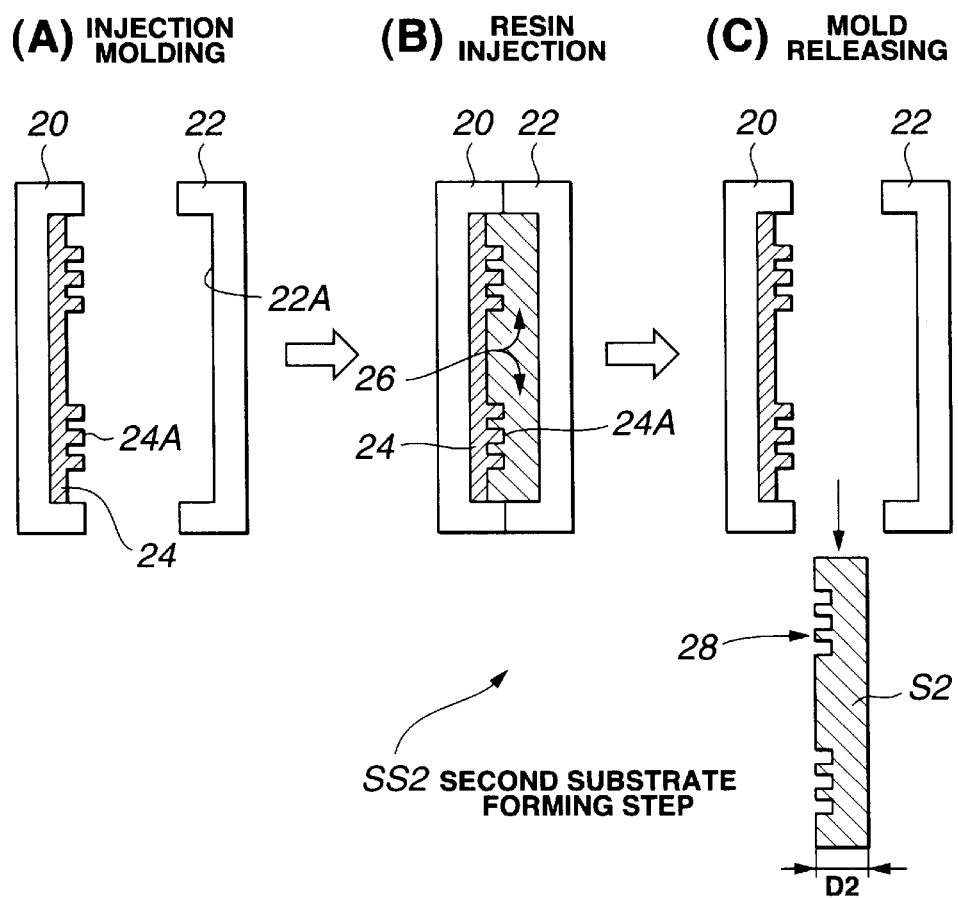
FIG. 2 is a schematic cross-sectional view showing a second substrate preparing step.
Figure 3:
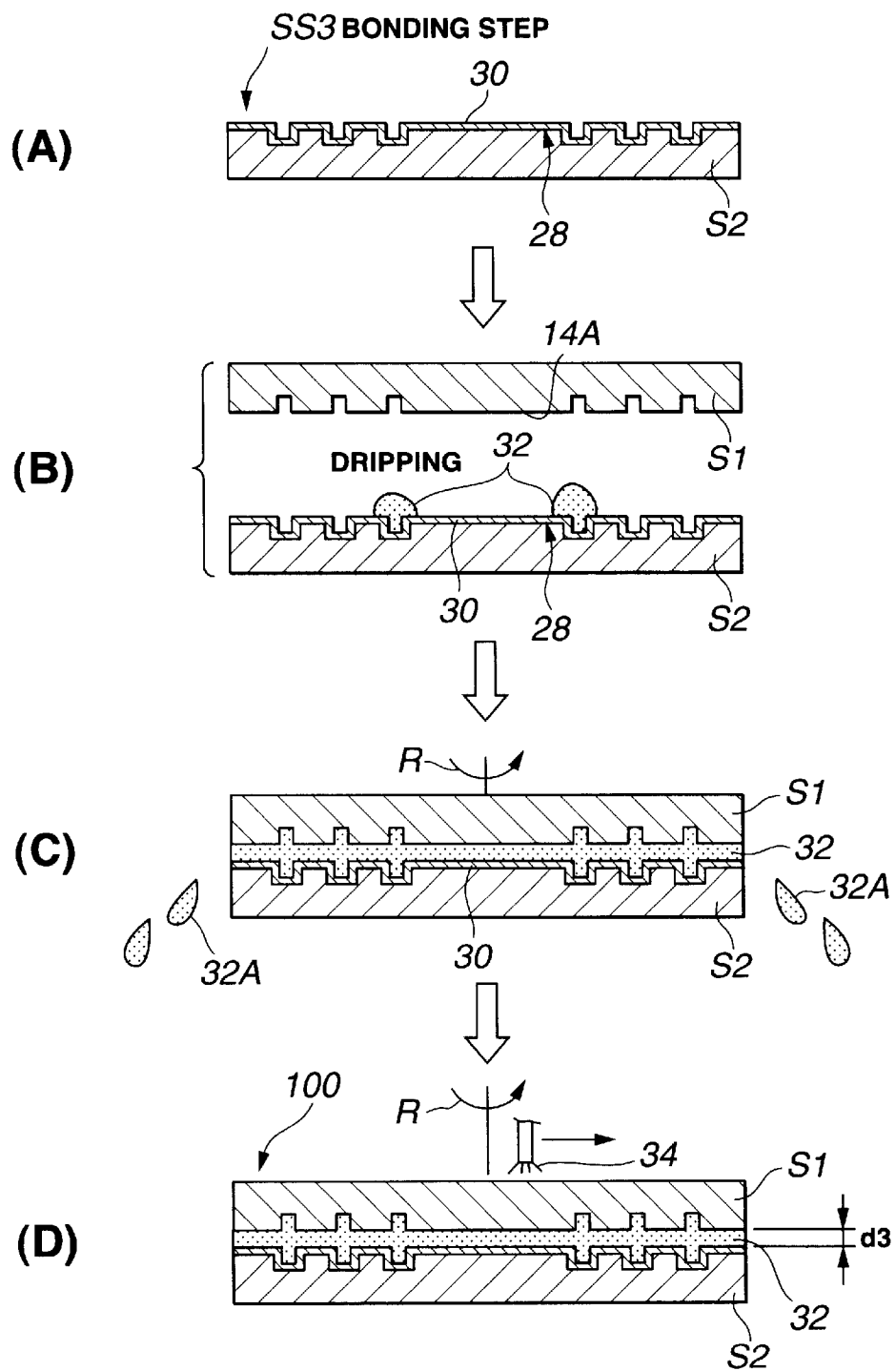
FIG. 3 is a schematic cross-sectional view showing a bonding step.
Figure 5:
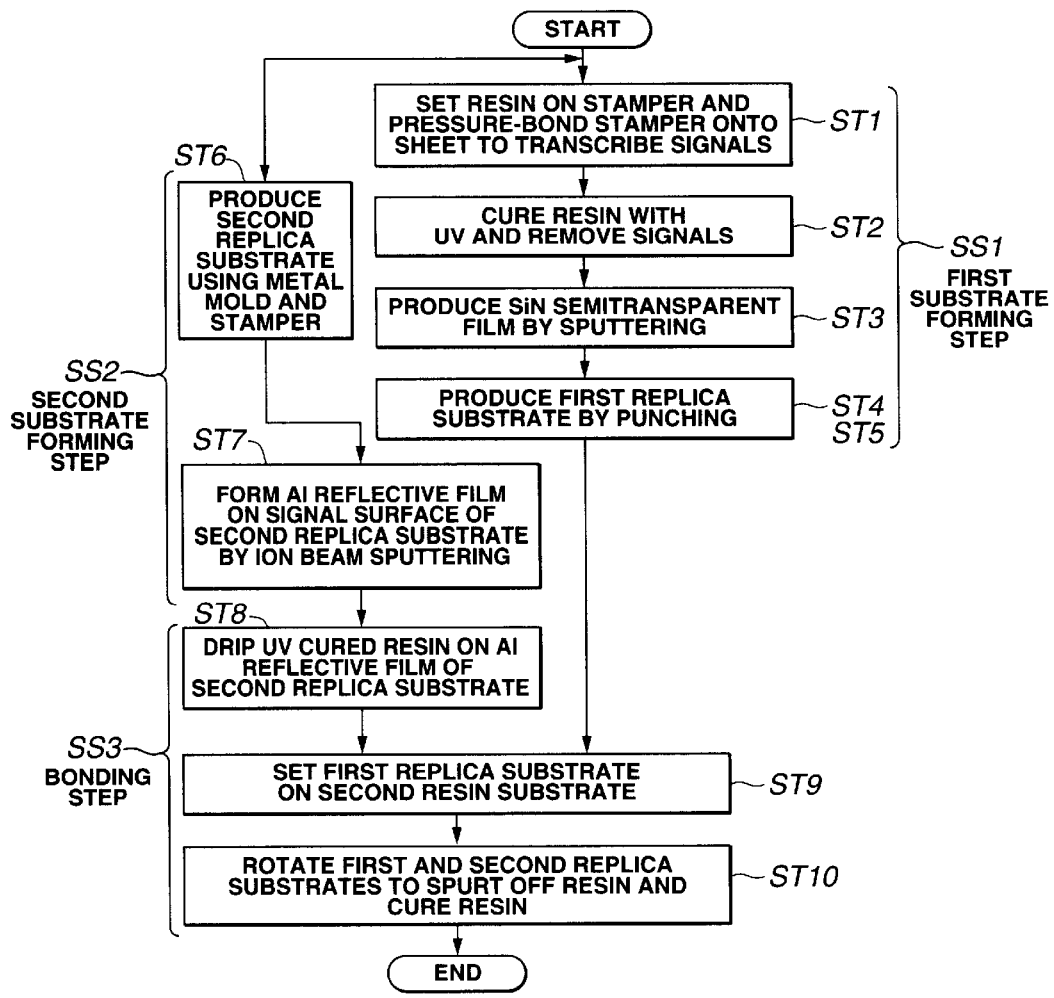
FIG. 5 is a flowchart showing an illustrative sequence for the manufacturing method shown in FIGS. 1 to 3.

FIGS. 1 to 3 illustrate an embodiment of a method for producing a multi-layered disc-shaped information recording medium according to the present invention, and FIG. 5 shows a process flow for this manufacturing method.

The manufacturing method for the disc-shaped information recording medium, shown in FIG. 1, employs a so-called glass photosensitive resin method (glass method or glass photo-polymerization method). FIG. 1 shows a step SS1 for preparing a first replica substrate (first substrate) S1, while FIGS. 2 and 3 show a step SS2 for preparing a second replica substrate (substrate) S2 and a step SS3 of bonding the first replica substrate S1 and the second replica substrate S2, respectively.

The first substrate preparing step SS1, the second substrate preparing step SS2 and the bonding step SS3 are shown in FIG. 5.

First, the first substrate preparing step SS1 of FIGS. 1 and 5 is explained.

In the first substrate preparing step SS1, a first replica substrate S1, shown in FIG. 1(G), is finally prepared. In this step SS1, a non-interrupted sheet 10 is used and is wound in a roll.

The sheet 10 may be formed of synthetic resin, such as light-transmitting or transparent polycarbonate or polymethyl methacrylate, and is of a thickness preferably of 50 to 150 $\mu$m. The most preferred value of the sheet 10 is 70 $\mu$m.

In FIG. 1(A), a first stamper 12 is arranged at a separation from one surface 10A of the sheet 10. On the first stamper 12 is previously formed an inverted pattern of a signal recording pattern comprised of fine crests and grooves corresponding to information signals to be formed on the first replica substrate S1. Such pattern is prepared by sputtering metal on a mother stamper and by forming its inverted pattern. In FIG. 1(B), a photo-curable resin, such as UV light curable resin 14, is formed on a signal pattern forming surface of the first stamper 12 (step ST1 of FIG. 5).

In FIG. 1(C), the UV light curable resin 14 of the first stamper 12 is tightly bonded to the one surface 10A, and pressed by a roll 16 to accurately transfer the signal recording pattern on the first stamper 12 comprised of crests and grooves corresponding to the signals onto the UV light curable resin 14. In FIG. 1(D), UV light is illuminated from UV light illuminating means to cure the UV light curable resin 14.

Referring to FIG. 1(E), only the first stamper 12 is peeled from the sheet 10 so that the UV light curable resin 14 and the sheet 10 are tightly bonded together (step ST12).

In FIG. 1(F), a SiN semi-transparent film is formed on sputtering on the signal surface 14A of the UV light curable resin 14 (step ST13).

A layered product of the sheet 10 and the UV light curable resin 14, prepared by the process steps of FIGS. 1(A) to 1(F), is punched to a disc shape in FIG. 1(G) to produce a first replica substrate S1 (steps ST4 and ST5).

At the second substrate producing step ST2 of FIGS. 2 and 5, metal molds 20, 22 are prepared. The inner surface of the metal mold 22 is finished to a mirror surface 22A. On the molding surface of the metal mold 20 is mounted a second stamper 24. From the state of FIG. 2A, a synthetic resin 26 is injected in a combined state of the metal molds 20, 22, as shown in FIG. 2(B). As the synthetic resin 26, polycarbonates or amorphous polyolefins, exhibiting transparency or light transmission properties, is usable. In the final form as a disc, the second replica substrate S2 is not required to exhibit optical properties, so that suitable fillers may be admixed to improve toughness.

On the synthetic resin 26, injected to a space between the metal molds 20, 22, there is transcribed a signal recording pattern 24A as a fine pattern of crests and grooves. In FIG. 2(C), the metal molds 20, 22 are opened apart to release the second replica substrate S2 to produce the second replica substrate S2 having a signal surface 28 having transferred thereto the signal recording pattern provided on the second stamper 24. The second replica substrate S2 has a thickness D2 of 0.6 to 1.2 mm (step ST6 of FIG. 5).

The step SS1 for preparing the first substrate and the step SS2 for preparing the second substrate may be carried out simultaneously or at different timing. At any rate, the bonding step SS3, comprised of the step ST9 and the step ST2 shown in FIG. 5, is carried out at a time point the step SS1 for preparing the first substrate and the step SS2 for preparing the second substrate are terminated. In the bonding step SS3, shown in FIG. 3, a reflecting film 30 of e.g., Al is formed, such as by ion beam sputtering, on the signal surface 28 of the second replica substrate S2 (step ST7). The reflecting film 30 in this case has a thickness e.g., of 40 mm.

In FIG. 3(B), a pre-set amount of a UV light curable resin is applied dropwise on the reflecting film 30 of the second replica substrate S2 (step ST8). Through this UV light curable resin 32, the signal surface 14A of the first replica substrate S1 is bonded to the reflecting film 30 of the second replica substrate S2 in a facing manner (step ST9). FIG. 3(C) shows this state, in which, as the first replica substrate S1 and the second replica substrate S2 are rotated in unison in the direction indicated by arrow R, the UV light curable resin 32 is spurted to outside as an excess resin portion 32A to permit a moderate amount of the UV light curable resin 32 to be deposited to a pre-set thickness to form a transparent adherent layer of the UV light curable resin 32 to bond the first replica substrate S1 and the second replica substrate S2 together (step ST10).

In FIG. 3(D), a UV light beam 34 is moved radially at a pre-set speed from the inner rims towards the outer rims of the substrates S1 and S2. Moreover, the substrates S1, S2 are run in rotation, thus curing the UV light curable resin 32. The thickness d3 of the UV light curable resin 32 may be set to, for example, 50 µm (step ST10).

In this manner, a multi-layered large-capacity disc-shaped information recording medium 100 may be prepared. Typical of these disc-shaped information recording mediums 100 are a Compact Disc, a CD-memory (a read-only memory exploiting the Compact Disc), other optical discs, digital video discs, an optical disc exemplified by a high density information recording mediums, termed a digital versatile discs (DVD), and other information recording mediums, such as magneto-optical disc.

By illuminating the UV light 34 and by rotating the substrates S1, S2, as shown in FIG. 3(D), the UV light 34 can be evenly illuminated on the UV light curable resin 32 to produce a transparent adherent layer as a uniform transparent intermediate layer.

The thickness d3 of the UV light curable resin 32 is desirably larger than 10 µm and smaller than 50 µm. If the thickness d3 of the UV light curable resin 32 is larger than 50 µm, reproduced signals are not optimum due to increased spherical aberration ascribable to the thickened light transmitting layer. If the thickness d3 is smaller than 10 µm, there is a risk that the return light from the opposite signal layer is overlapped and perceived as noise so that signals cease to be reproduced accurately.

Figure 4:
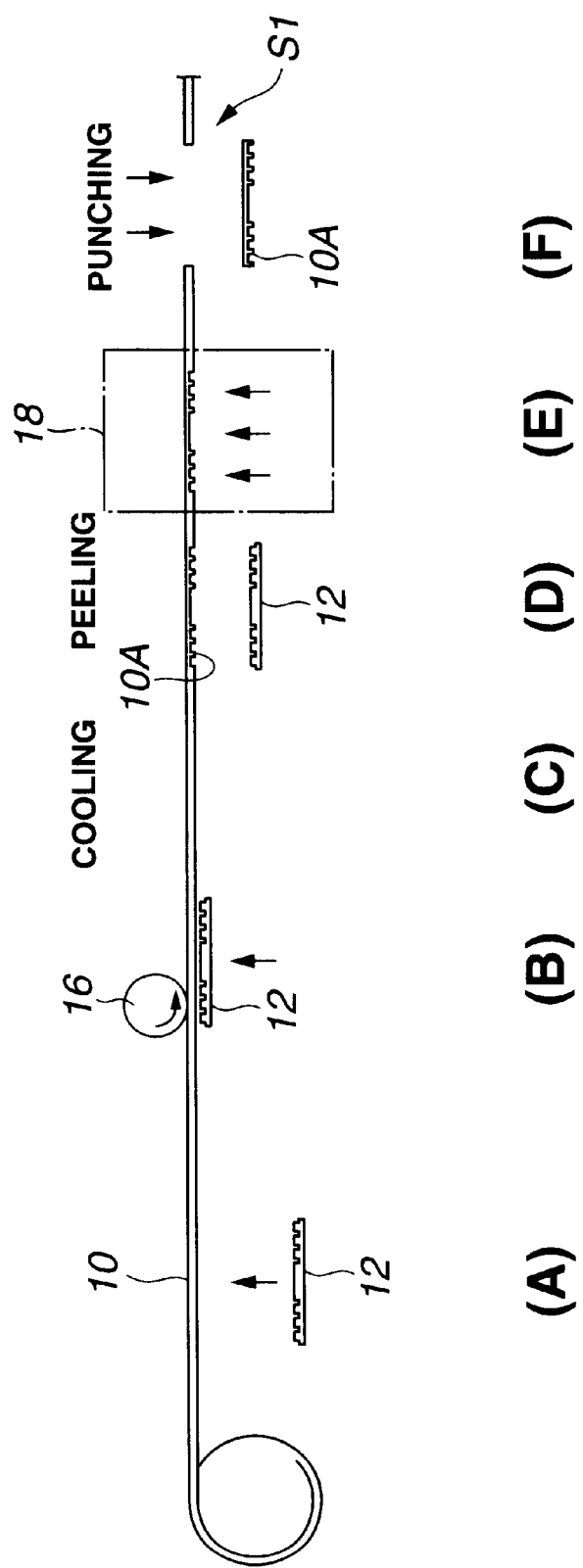
FIG. 4 is a schematic view showing a first substrate preparing step in a modified embodiment of the manufacturing method for a multi-layered disc-shaped information recording medium according to the present invention.

Referring to FIG. 4, another embodiment of the manufacturing method of the disc-shaped information recording medium according to the present invention is hereinafter explained. The manufacturing method of FIG. 4 employs a direct embossing method, such that the step for forming the first substrate SS1 shown in FIG. 4 differs from the step for forming the first substrate SS1 shown in FIG. 1. The bonding steps SS2 and SS3 shown in FIGS. 2 and 3 are basically identified with each other.

In the embodiment shown in FIG. 4, the direct embossing method is used, as described above, such that ultimately the first replica substrate S1 is produced as the first replica substrate S1 shown in FIG. 4(F).

In FIG. 4, a sheet 10 similar to the sheet 10 of FIG. 1 can be used. In FIG. 4(A), a first stamper 12 is used in association with the sheet 10. In FIG. 4(B), the signal recording pattern of the first stamper 12 is directly pressure-bonded at a roll 16 to the sheet 10. The sheet 10 is cooled in FIG. 4(C) and, in FIG. 4(D), the first stamper 12 is peeled from the sheet 10. In this manner, a signal surface 10A, having a signal recording pattern derived from the fine crests and grooves, is directly formed by transcription.

In FIG. 4(E), a semi-transparent film of SiN is formed by sputtering on the signal surface 10A. The sheet 10 then is punched into a disc shape as shown in FIG. 4(F) to produce a first replica substrate S1 (first substrate). This signal surface 10A of the first replica substrate S1 carries a signal recording pattern derived from the fine crests and grooves.

The sputtering process of FIG. 1(F) may be reversed from the sputtering process of FIG. 1(E) in the first substrate preparing step SS1 in FIG. 1, while the sputtering process of FIG. 4(E) may be reversed from the punching process shown in FIG. 4(F).

The first replica substrate S1, prepared as described above, may then be bonded to the second replica substrate S2, prepared at the second substrate preparing step SS2, as shown in FIG. 2, by the bonding step SS3 shown in FIG. 3, to prepare a multi-layered information recording medium 100 shown in FIG. 3(D). The second substrate preparing step SS2 and the bonding step SS3 are similar to the second substrate preparing step SS2 and the bonding step SS3 in FIG. 2 and hence are not explained here specifically.

The first replica substrate S1 and the second replica substrate S2, shown in FIGS. 1(G) and 2(C), may first be bonded together by a transparent adherent layer 32, as shown in FIG. 3(D), and subsequently punched together in a disc.

A further embodiment of the manufacturing method for the multi-layered disc-shaped information recording medium is now explained.

Figure 6:
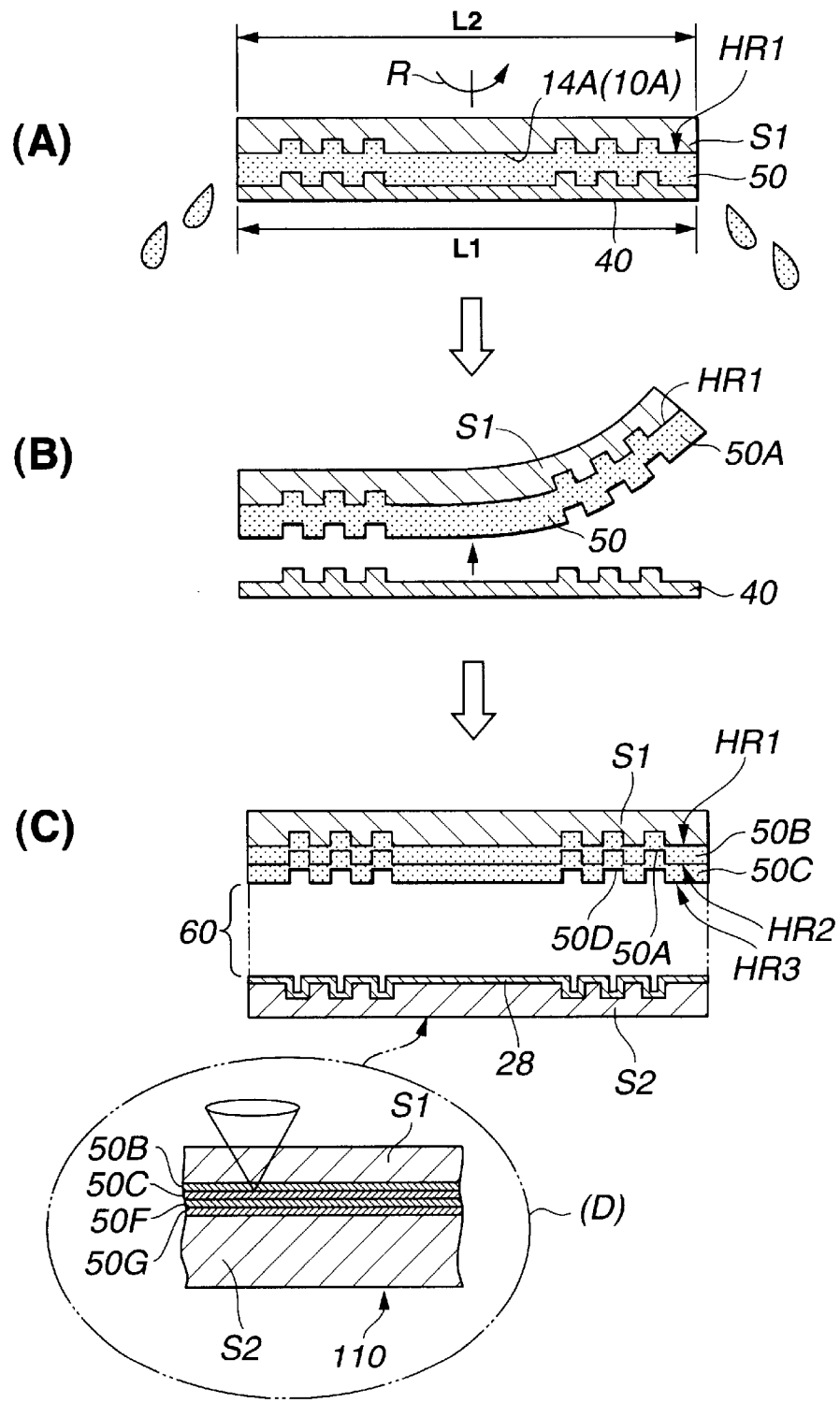
FIG. 6 is a schematic cross-sectional view showing an illustrative manufacturing method for a multi-layered reflective film.
Figure 7:
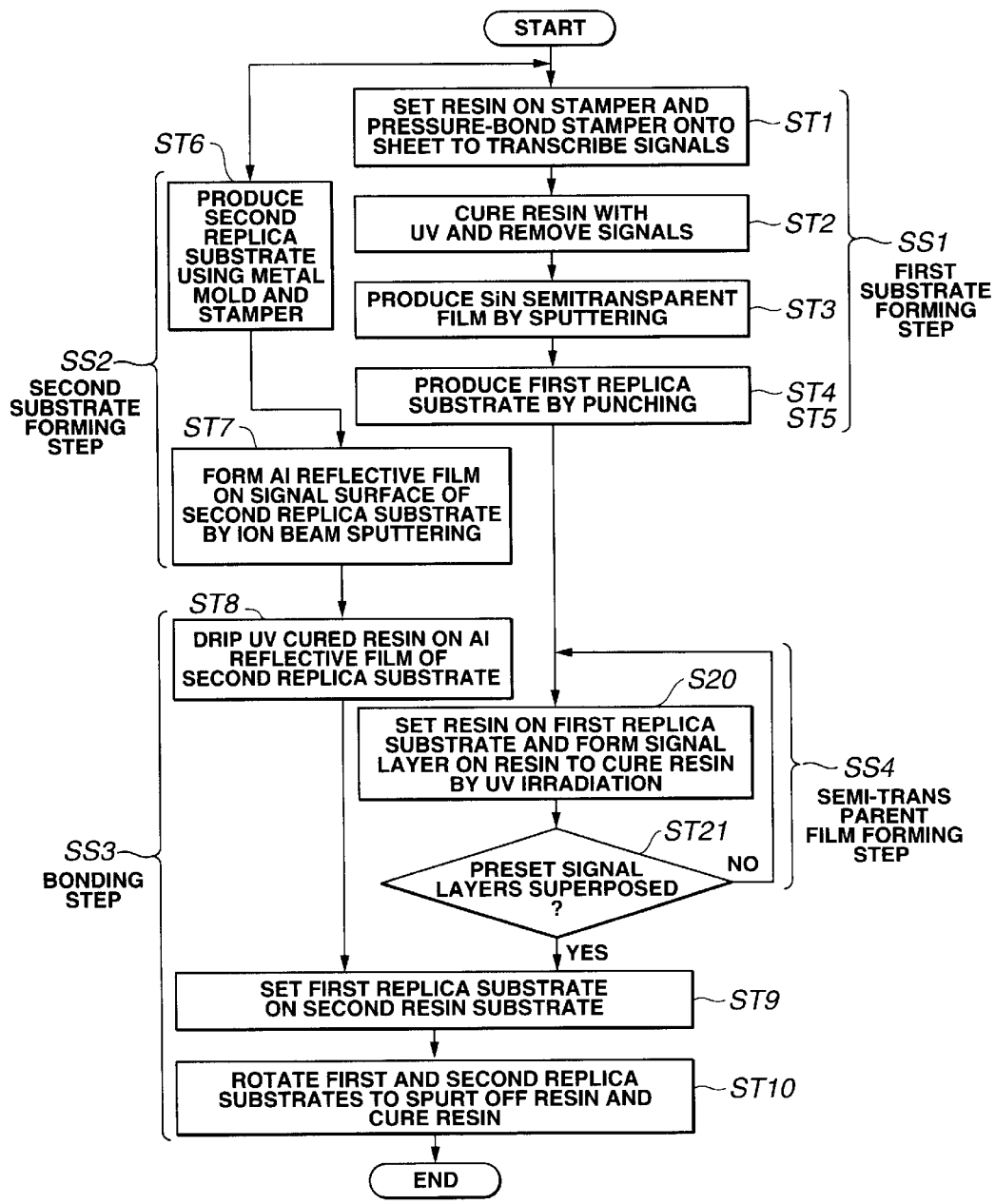
FIG. 7 is a flowchart showing an illustrative sequence in association with the manufacturing method of FIG. 6.

FIG. 6 shows a process for manufacturing a multi-layered disc having a larger number of layers. The first replica substrate S1, shown in FIG. 6(A), is that produced in the step SS1 for preparing the first substrate shown in FIG. 1 or the step SS1 for preparing the first substrate shown in FIG. 4. FIG. 7 shows a typical flow of the process for preparing the multi-layered disc shown in FIG. 6. The steps ST1 to ST10 of FIG. 7 are the same as those of steps ST1 to ST10 of FIG. 5 and hence are not explained specifically. However, in FIG. 7, additional steps ST20 and ST21 are used as a step SS4 for forming a semi-transparent film.

At the step ST20 of FIG. 7, a semi-transparent film HR1 is formed on the signal surface 14A or 10A of the first replica substrate S1 of FIG. 6(A). A UV light curable resin 50 is applied to the semi-transparent film HR1 and the signal surface of a stamper 40 is applied to this UV light curable resin 50. This causes the signal recording pattern, comprised of fine crests and grooves, formed on the stamper 40, to be transcribed to the UV light curable resin 50. Moreover, as the first replica substrate S1 an the stamper 40 are rotated in the direction indicated by arrow R, excess UV light curable resin 50 is spurted off to outside.

During this rotation, the UV rays are illuminated in dots from the inner rim towards the outer rim to permit the UV light curable resin 50 to be cured as the resin is controlled to a pre-set thickness. This cured UV light curable resin 50 serves as the semi-transparent film. The first replica substrate S1, unified to the UV light curable resin 50, is detached from the stamper 40, as shown in FIG. 6(B).

By repeating the steps of FIGS. 6(A) and 6(B) at the step ST21, a plurality of numbers of times, transparent adherent layers 50B, 50C, . . . and semi-transparent films HR1, HR2, HR3, . . . may be sequentially layered, as shown in FIG. 6(C). On the transparent adherent layers 50B are formed signal surfaces 50A, 50D, . . . carrying signal recording patterns comprised of fine crests and grooves. That is, a layered product of a semi-transparent film HR2 and a transparent adherent layer 50C is formed next to the layered product of the semi-transparent film HR1 and a transparent adherent layer 50B, and the next layered product of the semi-transparent film and the transparent adherent layer is further layered thereon to produce a multi-layered signal recording layer. On the respective layered products are formed signal surfaces 50A, 50D carrying signal recording patterns comprised of fine crests and grooves.

The transparent adherent layers 50B, 50C, . . . may also be formed using a dry photopolymer in place of UV light curable resin. In this case, a sheet-shaped dry photopolymer may be tightly contacted with the semi-transparent film HR1, instead of setting the UV light curable resin 50, and the stamper 40 may be intimately contacted with the opposite side. The UV light then is illuminated to realize a transparent adherent layer (signal recording layer) having transcribed thereon the signal recording pattern comprised of fine crests and grooves.

On the lowermost signal recording layer is then superposed and unified a signal surface 28 of the second replica substrate S2 carrying a signal recording pattern, as shown in FIG. 6(C). A multi-layered signal recording layer 60 may thus be formed into a multi-layered large-capacity disc-shaped information recording medium 110 as the multi-layered signal recording layer 60 is sandwiched between the first replica substrate S1 and the second replica substrate S2. In the case of FIG. 6(D), transparent adherent layers 50B, 50C, 50F and 50G and semi-transparent films HR1, HR2, HR3, are formed between the substrates 1 and 2. The second replica substrate S2 used may be that produced by the process of FIG. 3(A). The second replica substrate S2 used may also be a so-called dummy substrate devoid of a signal surface.

The thickness of each signal recording layer may, for example, be 10 to 50 $\mu$m. If the thickness is less than 10 $\mu$m, optical interference between superposed signal recording layers is undesirably produced, whereas, if the thickness is larger than 50 $\mu$m, spherical aberration is undesirably produced on light illumination from an optical pickup.

Meanwhile, the stamper 40 in FIG. 6A is desirably of a diameter L1 equal to or slightly smaller than a diameter L2 of the first replica substrate S1. The reason that the diameter L1 is set to this range is to prevent the UV light curable resin 50 from being left on the stamper 40 to elongate the useful life of the stamper 40. If the diameter L1 is smaller than the diameter L2, the difference between L1 and L2 is desirably smaller than e.g., 0.5 mm.

Figure 8:
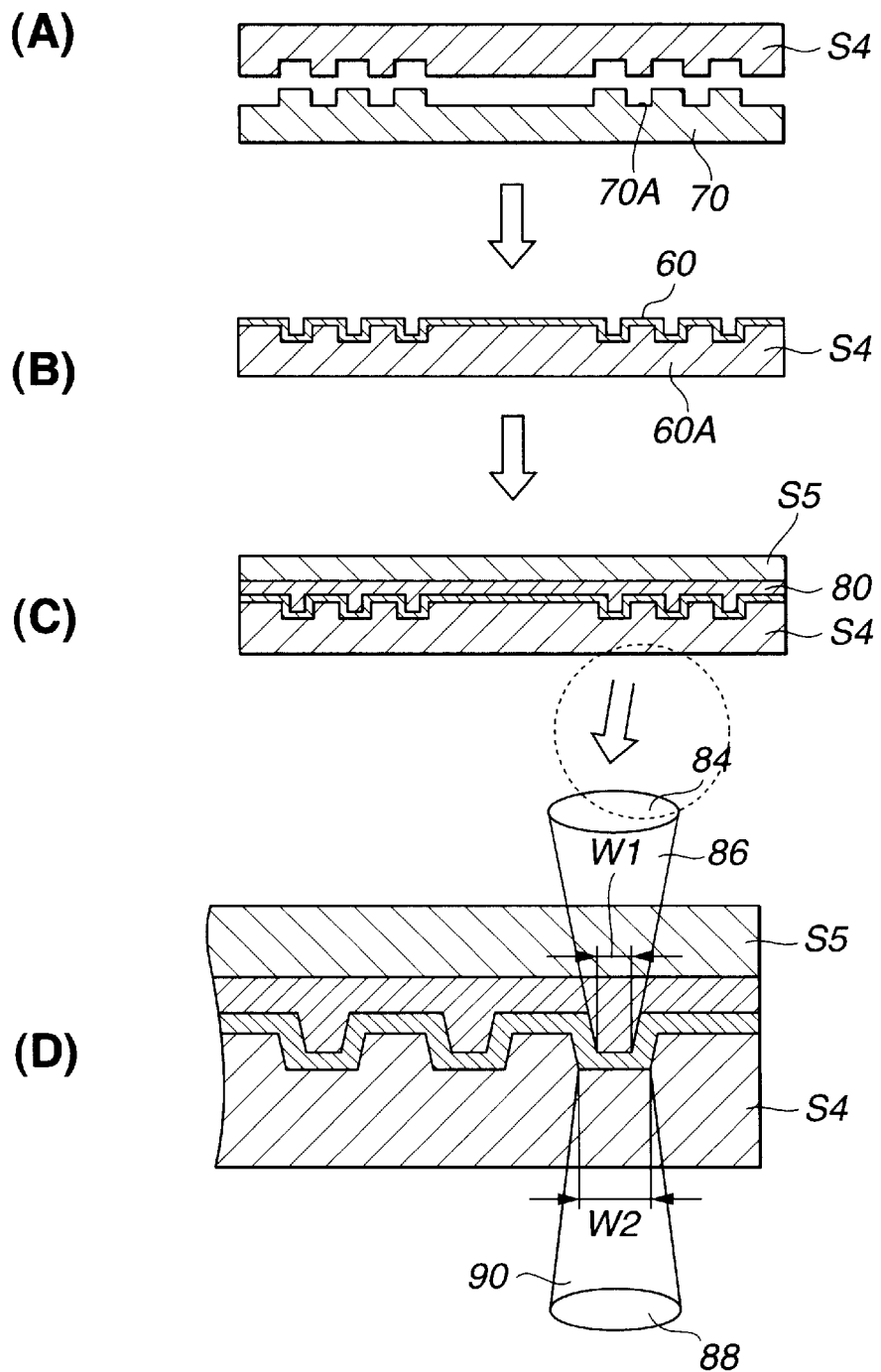
FIG. 8 is a schematic cross-sectional view for illustrating a typical jitter in the signal surface reproducing system and in the readout surface reproducing system.

FIG. 8 shows, as an example, a stamper 70 and a replica substrate 80 produced by the stamper 70. The stamper 70 may be that produced in the conventional optical disc manufacturing process, with the track pitch of the signal surface 70A being e.g., 0.50 $\mu$m, with the linear density being 0.185 $\mu$m/bit. The EFM (eight-to-fourteen modulation) similar to that used in preparing a high density information recording medium may be used. If the diameter of the compact disc size is 12 cm, the recording capacity is 10 GB.

A reflective film (recording film) 60 is realized on a signal surface 60A of a replica substrate S4 prepared as shown in FIGS. 8(A) and 8(B). Another replica substrate S5 is unified to the replica substrate S4 by a transparent adherent layer 80 to provide a disc-shaped information recording medium. In such information recording medium, shown in FIG. 8(C), a case in which a light beam 86 is illuminated from the replica substrate S5 through an objective lens 84 and a case in which a light beam 90 is illuminated from an objective lens 88 through the replica substrate S4, as shown in FIG. 8(D), are compared to each other. The system employing the objective lens 84 is termed a signal surface reproducing system and a system employing an objective lens 88 is termed a readout surface respective system.

With the use of the signal surface reproducing system, jitter on the readout surface may be lowered to 6.5%. With the readout surface respective system, the best value of jitter is as high as 8%. So, the signal surface reproducing system is superior to the readout surface respective system, insofar as jitter is concerned.

The numerical aperture (NA) of the objective lens 84 during reproduction in this case is e.g., 0.875, with the wavelength of the light beams 89, 90 being 640 nm. The reason this difference is produced is that, since the pit width W1 in the signal surface reproducing system can be smaller than the pit width W2 in the readout surface respective system, the inter-symbol interference in reproduction is less in the signal surface reproducing system than that in the readout surface respective system. The reason this is possible is that, since the reflective film is formed uniformly, the signal pit becomes smaller.

This signal reproduction from the planar side (readout surface side) of the replica substrate is not meritorious as compared to the case of reproduction from the crests and groove transcription surface (signal surface).

Figure 9:
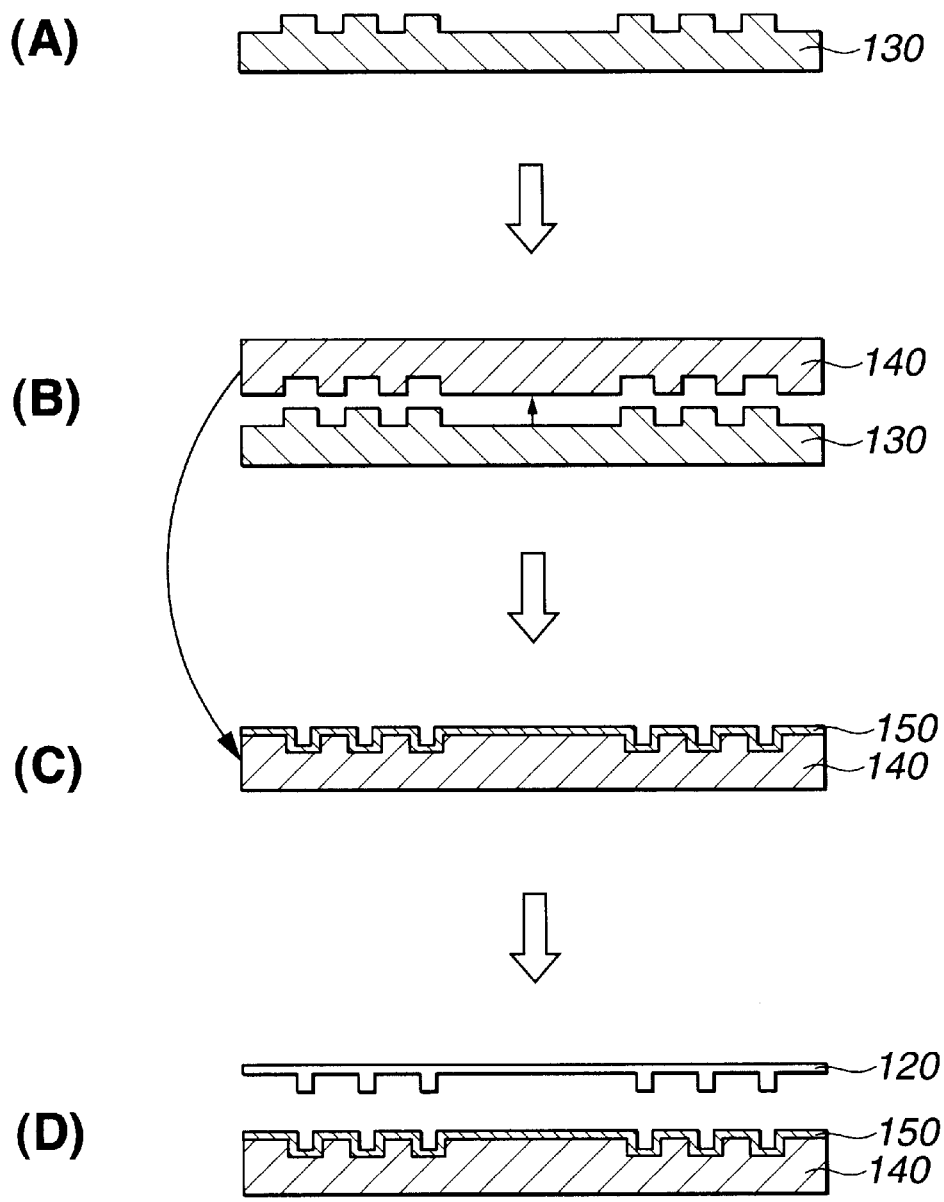
FIG. 9 is a schematic cross-sectional view showing an instance of preparing a stamper from a master stamper.

The multi-layer disc-shaped information recording medium 100 according to the present invention, as shown in FIG. 3(D), is of the type in which reproduction is from the planar surface (readout surface). In order to reproduce signals accurately from the multi-layered disc-shaped information recording medium, designed for signal reproduction by the readout surface reproducing system, it is desirable to produce a stamper as shown in FIG. 9.

A sun-stamper 120 of FIG. 9(D) may be used as a first stamper 12 of FIG. 1 or as a first stamper 12 of FIG. 4.

This sun-stamper 120 may be produced by a process from FIG. 9(A) to FIG. 9(D).

From a master stamper 130, shown in FIG. 9(A), a mother stamper 140 in FIG. 9(B) is prepared. A signal recording pattern, formed on the master stamper 130, is transcribed to the mother stamper 140. This mother stamper 140 is termed a reversing stamper. On this mother stamper 140, a Ni sputtering film 150, for example, is formed, as shown in FIG. 9(C). The mother stamper 140 has its signal surface transcribed to the stamper 120, as shown in FIG. 9(D).

The produced stamper 120 can be used as a first stamper 12 shown in FIGS. 1 and 4. The thickness of the Ni sputtering film 150 in FIG. 9(C) is e.g., 40 nm.

From the multi-layered disc-shaped information recording medium 100 (S1 of FIG. 3), obtained by the process of FIG. 1 or 4, using the stamper 120 prepared from the master stamper 130, with the master stamper being left, it is possible to produce signals of approximately equal quality to S1 of the multi-layered disc-shaped information recording medium 100 produced with the use directly of the master stamper 130 as the first stamper 12 shown in FIG. 1 or 4.

Meanwhile, the second replica substrate S2, produced in the second substrate preparing step SS2, may be designed to be of a double-surface structure by recording signals on both its surfaces.

Meanwhile, the numerical aperture NA of an objective lens of an optical pickup in case of reading out the multi-layered large-capacity disc-shaped information recording medium 100 in replay is desirably not less than e.g., 0.7. Also, the ratio of the numerical aperture NA to the wavelength $\ddot{e}$ (NA/$\ddot{e}$) is desirably not less than 1.20. One or desirably both of these conditions (NA/$\ddot{e}$)≧1.20 and NA>0.7 is to be met.

Figure 10:
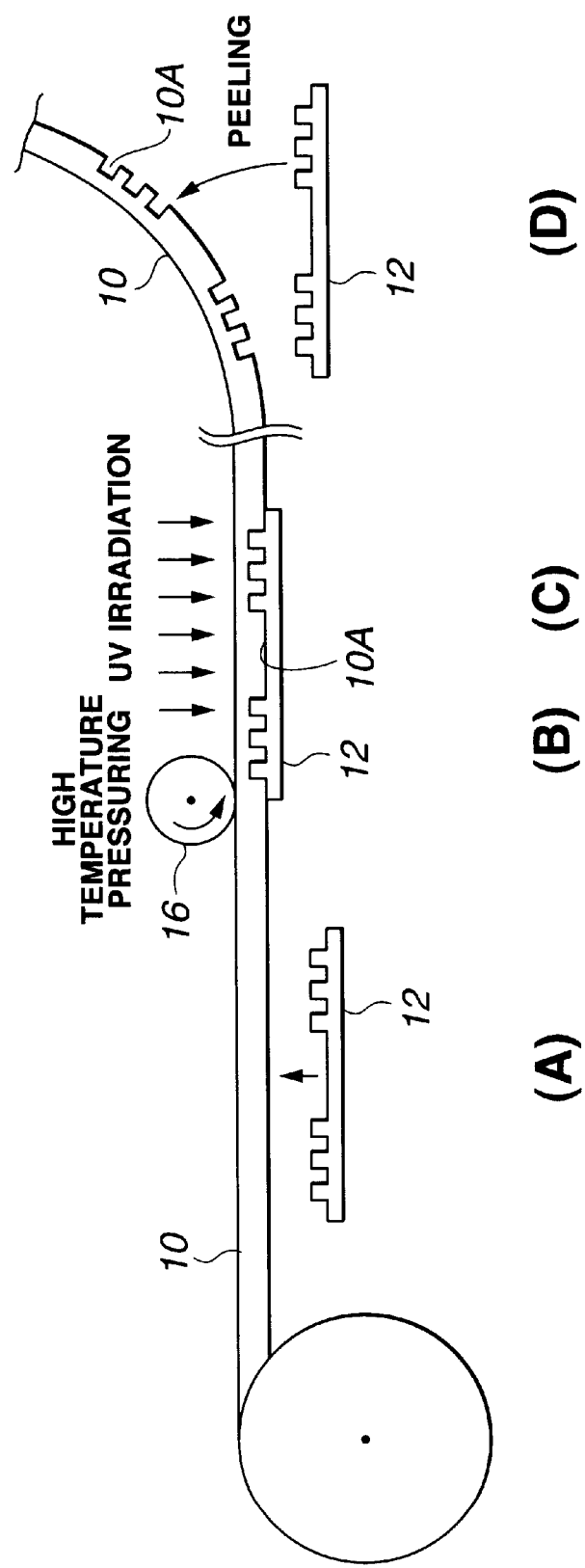
FIG. 10 is a schematic view showing a modification of the manufacturing method for a sheet-shaped substrate.
Figure 11:
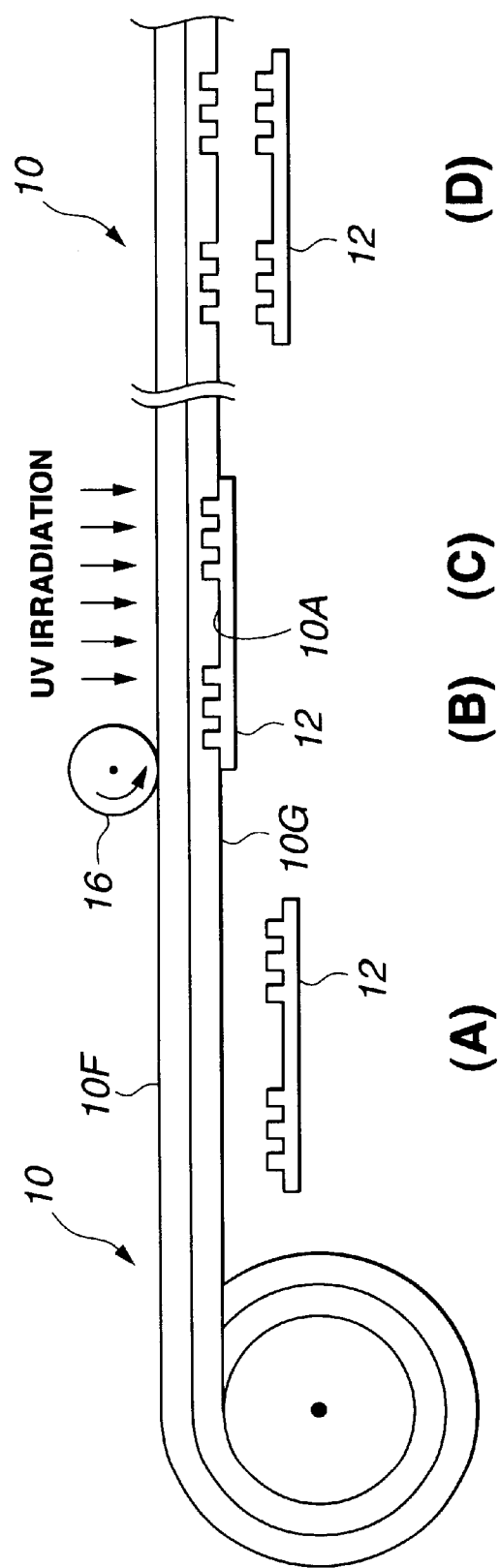
FIG. 11 is a schematic view showing another a modification of the manufacturing method for a sheet-shaped substrate.
Figure 12:
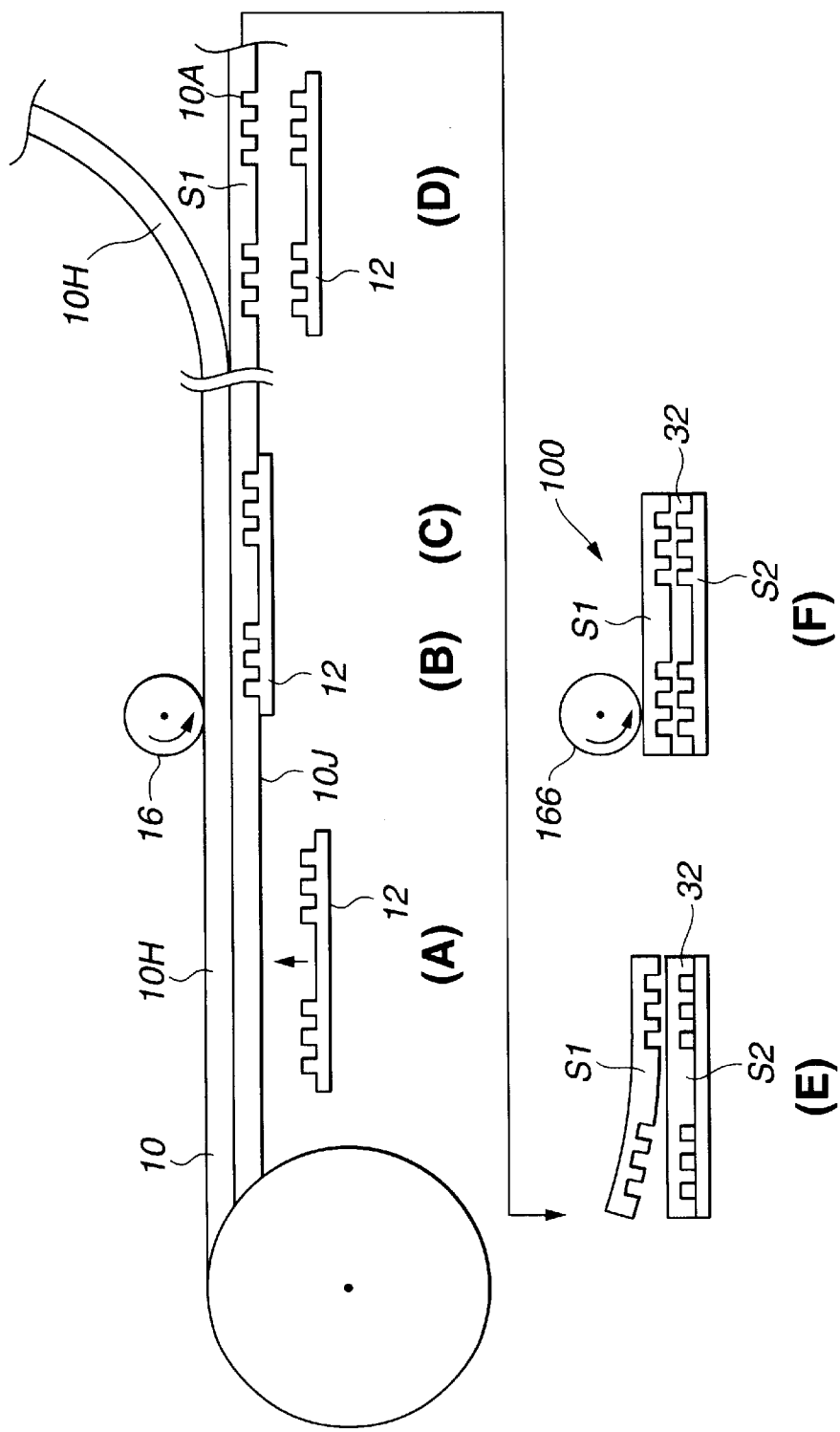
FIG. 12 is a schematic view showing an illustrative manufacturing step for a sheet-shaped substrate and the bonding step of bonding on the second replica substrate.

FIGS. 10 to 12 show another embodiment of the manufacturing method of the present invention.

In the manufacturing method of FIG. 10, an elongated sheet 10 is of a dry photopolymer. This film or layer of the dry photopolymer is a substantially solvent-free polymeric (high molecular) layer. This polymeric layer has creep viscosity ranging between e.g., 100 and 200 megapoise. This creep viscosity may be measured using a flow meter of the parallel flat plate type.

In FIG. 10, a signal surface carrying a signal recording pattern may be recorded on such sheet 10 using a high temperature high pressure bonding method. FIGS. 10(A) to 10(D) substantially correspond to the process of FIGS. 4(A) to 4(D).

On the sheet 10 is mounted a first stamper 12, as shown in FIG. 10(A). In FIG. 10(B), the first stamper 12 is thrust by the roll 16 against the sheet 10 to produce a signal surface 10A on which there is formed a signal recording pattern of minute crests and grooves provided on the first stamper 12. The UV light beam then is illuminated on this sheet 10 in FIG. 10(C) to cure the signal surface 10A carrying the signal recording pattern of these minute crests and grooves. In FIG. 10(D), the first stamper 12 thus cured is removed from the sheet 10. A replica substrate similar to the first replica substrate S1 shown in FIG. 4 is produced by the sputtering and punching process as shown in FIGS. 4(E) and 4(F).

In FIG. 11, a dry photopolymer 10G as described above, is layered on a film 10F of e.g., transparent polycarbonate to realize the sheet 10. In this case, the first stamper 12 is again thrust, using the roll 16, as shown in FIG. 11(B), and subsequently the UV light is illuminated to cure the dry photopolymer 10G. The sheet 10 then is removed from the first stamper 12, as shown in FIGS. 11(C) to 11(D), and the process steps of sputtering of the semi-transparent film and punching is carried out to produce the first replica substrate.

In FIG. 12, the sheet 10 is prepared by layering a protective sheet 10H and a pressure-sensitive sheet 10J. The protective sheet 10H may be a film of polycarbonate, while the pressure-sensitive sheet 10J may be a pressure-sensitive adhesive sheet, such as acrylic adhesive sheet. The pressure-sensitive sheet 10J is preferably selected to have a refractive index equivalent to that of a synthetic resin, such as polycarbonate.

In FIG. 12A, the first stamper 12 faces the pressure-sensitive sheet 10J. In FIG. 12B, the first stamper 12 is thrust by the roll 16 against the pressure-sensitive sheet 10J. The first stamper 12 is removed from the pressure-sensitive sheet 10J, at the same time as the protective sheet 10H is removed from the pressure-sensitive sheet 10J. This pressure-sensitive sheet 10J includes a signal surface 10A, having a signal recording pattern of fine crests and grooves transcribed from the first stamper 12. If the sputtering of the pre-set semi-transparent film and the punching are then performed, the first replica substrate S1 shown in FIG. 12(E) is produced.

On the other hand, the second replica substrate S2 is already produced. The second replica substrate S2 and the first replica substrate S1 are pressure-bonded together by the roll 66, using the UV light curable resin 32, as shown in FIG. 12(F), to produce the multi-layered disc-shaped information recording medium 100.

Figure 13:
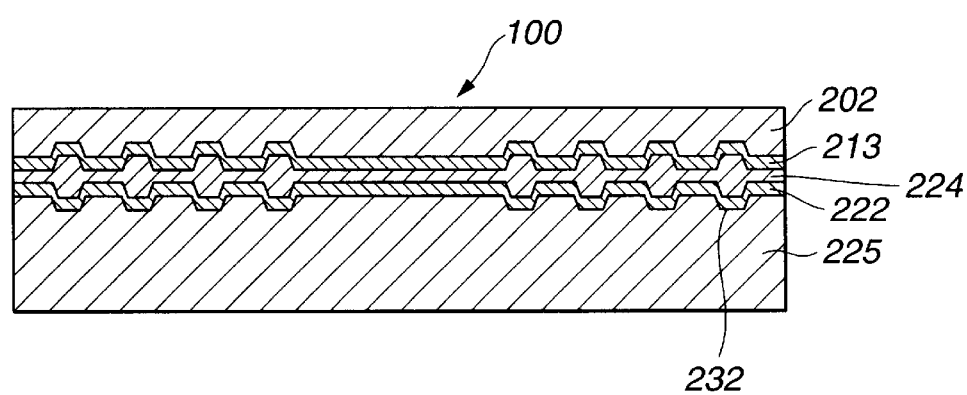
FIG. 13 is a schematic cross-sectional view showing an illustrative multi-layered optical disc comprised of a sheet-shaped substrate carrying a signal surface and which is layered on a molded substrate.

FIG. 13 shows a typical disc-shaped information recording medium 100 of a dual-layer structure prepared by the manufacturing method of the present invention. This information recording medium 100 has a molded substrate 225 (second replica substrate) and a sheet-shaped substrate 202 (first replica substrate), with the molded substrate 225 and the sheet-shaped substrate 202 being unified together by a light transmitting layer 224 (UV light curable resin). On an information surface 232 of the molded substrate 225 is formed a recording layer or a reflective film 222, while a recording film (semi-transparent recording film) 213 is formed on the sheet-shaped substrate 202.

Figure 14:
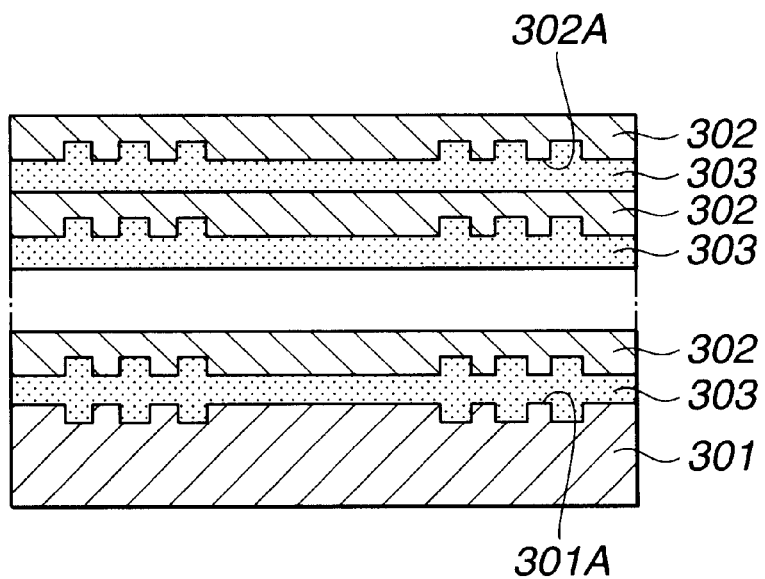
FIG. 14 is a schematic cross-sectional view showing an illustrative multi-layered optical disc having plural layers of the sheet-shaped substrates layered on the molded substrate, each sheet-shaped substrate carrying a signal surface formed thereon.

FIG. 14 shows a typical multi-layered optical disc including plural layers of sheet-shaped substrates 302 on a molded substrate 301 corresponding to the second replica substrate.

The molded substrate 301 is formed in the step shown in FIG. 2 and has its one surface as a signal surface 301A on which a reflective film, a recording film and so forth are formed.

On the other hand, the sheet-shaped substrates 302 is prepared by the process shown in FIG. 1 or 4, and have a surface facing the molded substrate 301 as a signal surface 302A.

It is noted that a plurality of such sheet-shaped substrates 302 are layered together, with the interposition of pressure-sensitive resin layers, each with a thickness on the order of 5 to 20 μm, as transparent adherent layers, to constitute a multi-layered optical disc. That is, a plurality of sets of the sheet-shaped substrates 302 and the transparent adherent layers 303, as basic units, are layered together to constitute a multi-layered optical disc.

Figure 15:
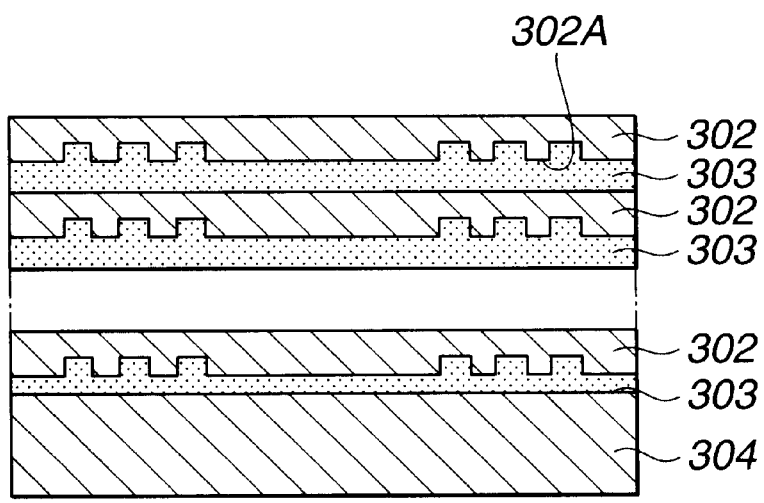
FIG. 15 is a schematic cross-sectional view showing an illustrative multi-layered optical disc having plural layers of the sheet-shaped substrates layered on a dummy substrate, each sheet-shaped substrate carrying a signal surface formed thereon.

The molded substrate 301 may be a so-called dummy substrate, a typical instance of which is shown in FIG. 15.

In this embodiment, a dummy substrate 304, devoid of a signal surface, is used as a second substrate. So, the number of layers of the signal surfaces is equal to the number of the sheet-shaped substrates 302.

With the manufacturing method for the multi-layered disc-shaped information recording medium, according to the present invention, described above, multi-layered disc-shaped information recording mediums with two or three or more layers, such as multi-layered optical discs, may be produced in large quantities.

In the above-described embodiments of the present invention, in which, in transcribing a signal recording pattern made up of fine crests and grooves onto a film or sheet from a stamper for transferring the signal recording pattern on the film or sheet, by way of patterning, such transcription operation is performed from a hard stamper to a relatively soft sheet, thus simplifying the transcription operation.

In producing a multi-layered semi-transparent film 60, shown in FIGS. 6(A) to 6(D), the semi-transparent films 50B, 50C, 50F and 50G, sequentially formed on the first replica substrate S1, are designed so that the reflectance will be higher in the direction proceeding from the semi-transparent film 50B towards the semi-transparent film 50G. That is, the semi-transparent film 50B is of the lowest reflectance, with the reflectance becoming higher in the order of the semi-transparent films 50C, 50F and 50G. So, if UV light rays are illuminated from the first replica substrate S1 to sequentially cure the semi-transparent films, the multi-layered semi-transparent film 60, as an intermediate layer, can be formed extremely readily. That is, the respective semi-transparent films can be sequentially cured with low radiation of UV light rays.

In this manner, in illuminating UV light to a UV light curable resin of e.g., a semi-transparent film, the disc can be illuminated uniformly over it s entire area by sequentially scanning from the center to the outer rim of the disc by UV light rays and by rotating the disc, thus realizing a transcription layer (intermediate layer) of a uniform thickness.

Industrial Applicability

According to the present invention, as described above, an information recording medium is prepared by a process in which a first substrate, obtained on punching a sheet, obtained in turn by having a signal recording pattern transcribed on it from a first stamper and by forming a semi-transparent film on a signal surface, is bonded to a second substrate obtained on injection molding a synthetic resin material. The second substrate is prepared by having transcribed to it a signal recording pattern formed on a second stamper provided on an injection molding device and by depositing a reflective film on a signal surface having the transcribed second substrate. The first and second substrates are bonded together on their signal recording layers by a transparent adherent layer. So, a disc-shaped large-capacity information recording medium can be manufactured readily in large quantities.

What is claimed is:

1. A multi-layered disc-shaped information recording medium comprising:
    a first substrate obtained on punching a sheet obtained in turn by having a signal recording pattern adherently transcribed thereon from a first stamper and by forming a semi-transparent film on a first signal surface; and
    a second substrate obtained on injection molding a synthetic resin material, said second substrate having transcribed thereon a second signal recording pattern from a second stamper provided on an injection molding device,
    a reflective film being formed on a second signal surface having said second substrate transcribed thereon;
    said first and second substrates being unified together by bonding respective signal recording surfaces thereof by a pressure-sensitive adhesive.

2. The multi-layered disc-shaped information recording medium according to claim 1 wherein said sheet is a pressure-sensitive sheet and wherein the first signal recording pattern is transcribed onto said pressure-sensitive sheet.

3. The multi-layered information disc-shaped recording medium according to claim 1 wherein a protective agent is coated on a surface of said sheet on which falls the laser light for recording and/or reproduction.

4. A method for producing a multi-layered disc-shaped information recording medium having plural layers each carrying a signal recording pattern, comprising the steps of:
    forming a first substrate by adherently transcribing a first signal recording pattern formed on a first stamper onto a sheet to produce a first signal surface;
    forming a semi-transparent film on said first signal surface and punching the resulting sheet:
    forming a second substrate by transcribing a second signal recording pattern formed by injection molding on a second stamper:
    forming a reflective film on a resulting signal surface: and
    bonding the first and second substrates by a pressure-sensitive adhesive.

5. The method for producing a multi-layered disc-shaped information recording medium according to claim 4 wherein, in the first substrate forming step, the resin is furnished to the first stamper facing to the sheet and the first stamper is pressed against the sheet to transcribe a signal recording pattern formed on said first to the resin.

6. The method for producing a multi-layered disc-shaped information recording medium according to claim 4 wherein, in the first substrate forming step, the first stamper is pressed against the sheet of synthetic resin to transcribe the signal recording pattern of the first stamper directly to the sheet.

7. The method for producing a multi-layered disc-shaped information recording medium according to claim 5 wherein a resin used in transcribing the first signal recording pattern is a dry photopolymer.

8. The method for producing a multi-layered disc-shaped information recording medium according to claim 4 wherein said sheet is prepared by bonding a protective sheet onto a pressure-sensitive sheet, said first substrate is prepared by transcribing the first signal recording pattern onto a pressure-sensitive sheet and subsequently removing the protective sheet, and wherein the second substrate is bonded to said first substrate.

9. The method for producing a multi-layered disc-shaped information recording medium according to claim 4 wherein a protective agent is coated on the surface of said sheet on which falls the laser light for recording and/or reproduction.

10. A multi-layered disc-shaped information recording medium having plural layers each carrying a signal recording pattern, comprising:
- a first substrate obtained by a sheet obtained in turn by having a signal recording pattern adherently transcribed thereon from a first stamper and by forming a semi-transparent film on a signal surface; and
- a second substrate including a signal surface having transcribed thereon a signal recording pattern from a second stamper by injection molding, said signal surface also carrying a reflective film, said second substrate being bonded to said first substrate by a pressure-sensitive adhesive with the interposition of one or more semi-transparent films.

11. The multi-layered disc-shaped information recording medium according to claim 10 wherein said first substrate is formed by bonding to a dummy substrate by a transparent adherent layer with the interposition of one or more semi-transparent films.

12. The multi-layered disc-shaped information recording medium according to claim 10 wherein said sheet is a pressure-sensitive sheet having a signal recording pattern transcribed thereon.

13. The multi-layered disc-shaped information recording medium according to claim 10 wherein a protective agent is coated on the surface of said sheet on which falls the laser light for recording and/or reproduction.

14. A method for producing a multi-layered disc-shaped information recording medium having plural layers each carrying a signal recording pattern, comprising the steps of:
- forming a first substrate by forming a signal recording pattern provided on a first stamper on a sheet and forming a semi-transparent film on a signal surface carrying said signal recording pattern;
- forming a semi-transparent film by forming one or more semi-transparent films, having a signal recording pattern transcribed thereon, on the semi-transparent film of said first substrate by the interposition of a transparent adherent layer;
- forming a second substrate by forming a reflective film on a signal surface having transcribed thereon a signal recording pattern formed on a second stamper by injection molding; and
- bonding the first and second substrate together by a pressure-sensitive adhesive with the interposition of one or more semi-transparent films.

15. The method for producing a multi-layered disc-shaped information recording medium according to claim 14 further comprising:
- a bonding step of bonding said first substrate to a dummy substrate by a transparent adherent layer with the interposition of one or more semi-transparent films.

16. The method for producing a multi-layered disc-shaped information recording medium according to claim 14 wherein said sheet is formed by bonding a protective sheet to a pressure-sensitive sheet and wherein said protective sheet is removed after transcription of the signal recording pattern to said pressure-sensitive sheet to produce said first substrate.

17. The method for producing a multi-layered disc-shaped information recording medium according to claim 14 wherein a protective agent is coated on the surface of said sheet on which falls the laser light for recording and/or reproduction.

* * * * *